May 12, 1953     H. F. HEIDEGGER     2,638,366
SPROCKET FASTENING MEANS
Filed Feb. 25, 1949
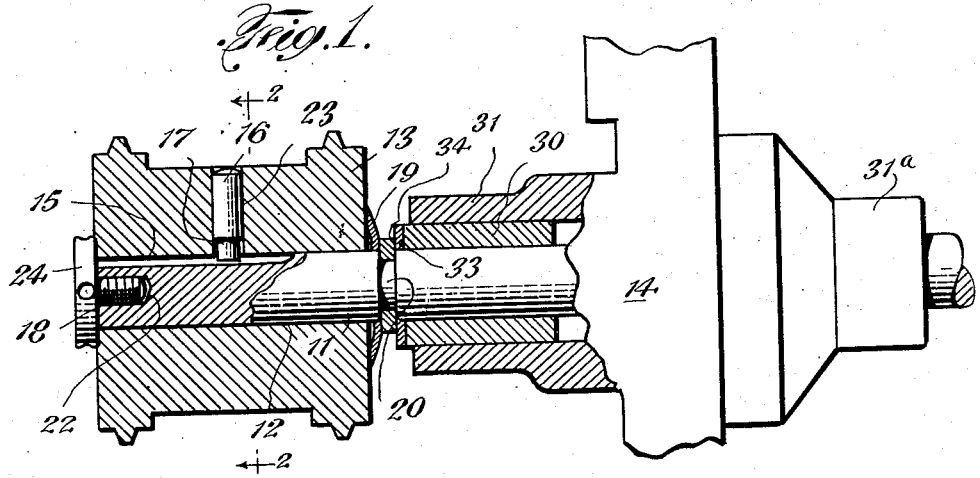
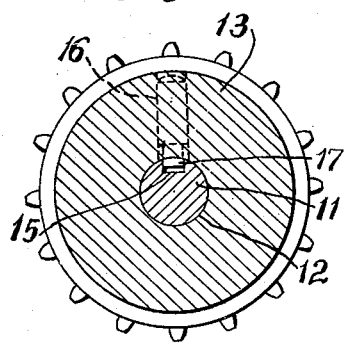
INVENTOR
HENRY F. HEIDEGGER
BY
James B. Boyer
ATTORNEY Patented May 12, 1953

2,638,366

UNITED STATES PATENT OFFICE 2,638,366

SPROCKET FASTENING MEANS

Henry F. Heidegger, Glen Ridge, N. J., assignor to International Projector Corporation, Bloomfield, N. J., a corporation of Delaware Application February 25, 1949, Serial No. 78,277

3 Claims. (Cl. 287—53)

This invention relates to improvements in sprocket fastening means, and is especially directed to a novel means for removably attaching a rotatable driving element, such as a film-feeding sprocket, or the like, to its shaft.

Although the invention is susceptible of use in mounting a great variety of sprockets, pulleys, or hubbed gears on their shafts, it is particularly suited for use in mounting film-feeding sprockets on their shafts, as indicated in U. S. Patent No. 2,312,760 issued to me on March 2, 1943 and upon which the present invention is an improvement.

In motion picture projecting machines the film passes over and under successive, continuously running and intermittently rotating toothed sprockets, the teeth of which enter sprocket holes formed in one or both margins of the film. The film is held engaged with the teeth by suitably supported, grooved guide or pad rollers embracing the circular series of teeth on the rims of the sprockets, there being a slight clearance between the pad rollers and toothed end flanges of the sprockets to avoid pinching the film.

To speed up the manufacture of sprockets for use in motion picture projecting machines, resort has been made to broaching and reaming the axially extending bores. Any bore that is broached is slightly barrel-shaped because such operation pushes the metal aside or compacts the metal, instead of cleanly removing it as would be the case if the bores were drilled, and as the broaching pressure is removed when the operation has been completed, the metal tends slightly to return to its former position.

Barrel-shaped bores are not readily detected by the usual gauges because the opposite open ends of the bores are generally of the correct diameter after reaming.

When a sprocket having a slightly barrel-shaped bearing is mounted on a rotatable shaft it tends to "run out" or have an elliptical orbit or wobble when firmly secured to its shaft. The use of such a sprocket in connection with the usual guide and film-retaining rollers is likely to result in pinching the film between the pad or guide rollers and the sprocket with a consequent liability of tearing or otherwise damaging the film. This injury is almost sure to occur when patched films are being fed and the patches take up more than the clearance normally present between the film and guide rollers. Hence, the patched portions of the film are liable to catch on the pad rollers and be torn.

Other objections reside in the usual methods heretofore used to rigidly secure the film sprockets to their shafts. For example, it has been customary to attach the sprocket wheels to their shafts by ordinary set screws threaded into radial holes drilled into the longitudinal bores of the sprockets at points between the ends of the sprockets, the inner ends of the set screws bearing firmly against the peripheries of their shafts. This simple method of fastening the sprockets to their shafts was intended to enable the sprockets to be readily removed and replaced for repairs or to obtain access to other mechanism behind the sprockets. One objection to this method is that when the retaining set screw is turned down tightly on the periphery of the shaft it tends to bend the shaft. Since the bores of the sprockets are formed slightly larger in diameter than the diameter of the shaft so as to readily slip onto their shafts this method of fastening takes up the clearance along one side of the sprocket and increases the clearance on the diametrically opposite side, resulting in eccentrically positioning the sprocket on the shaft.

A similar result occurs if a reverse arrangement be resorted to wherein the radial hole in the sprocket is unthreaded, but is shouldered or counter-bored and a threaded hole formed radially of the shaft. The radial holes in the sprocket and shaft are aligned and a headed set screw entered in the unthreaded counter-bored radial sprocket hole and screwed into the threaded hole in the shaft. When the screw is tightened with its head against the shoulder in the counter-bored sprocket hole the shaft is drawn towards the screw instead of being forced away, but the same eccentric positioning of the sprocket on the shaft occurs because of the clearance provided as above explained.

Another objection present in the set screw method of securing pulleys, sprockets and the like directly onto shafts is that when setting the screw fast on the shaft, the force required to firmly engage the screw with the shaft not only causes the end of the screw to indent the shaft, but as the screw is given the last turn or turns, the end of the screw raises a bur on the shaft which forms an obstruction preventing the attached sprocket or the like from being readily slid off the shaft, and, of course, opposes the placing of a sprocket on the shaft.

One principal object of the present invention is to provide means to attach a sprocket or gear in proper position on a shaft by novel means which avoids the foregoing disadvantages and retains the advantage of ease of applying and removing.

Thus, the improvement constituting the present invention provides novel means for retaining the sprocket or analogous part on a shaft against relative rotation, in such a manner as to avoid not only an eccentric mounting of the sprocket, but also the danger of bending the shaft heretofore incident to the former methods of securing the part to the shaft. This improvement is attained by mounting the sprocket loosely on its shaft while providing for the resilient and adjustable centering of the part on the shaft, instead of fastening the part tightly on the shaft as practical heretofore. By thus mounting the sprocket on its shaft, the sprocket can automatically center itself or maintain concentricity with the shaft, which affords the sprocket a radial self-adjustment relatively to the shaft.

Other objects and advantages will be more fully set forth hereinafter and particularly pointed out in the claims.

In the accompanying drawings,

Fig. 1 is a longitudinal view, partly in section, showing one form of the invention;

Fig. 2 is a cross-sectional view on line 2—2 of Fig. 1.

The present invention is designed as an improvement over prior inventions of similar nature by avoiding the necessity for firmly clamping the sprocket frictionally or otherwise to the shaft to secure the sprocket and shaft fixedly together as a substantially integral unit.

Instead, according to this invention, the shaft is entirely relieved of any radial pressure or stress in its relation with the sprocket, the connection of the sprocket with the shaft being effected by utilizing a wholly different principle, which not only avoids any damage to the shaft, but also requires little if any change in the sprocket, and enables the sprocket, in operation, to automatically maintain its concentricity with the shaft.

To these and other ends, in the form of the invention shown in Figs. 1 and 2, the shaft 11, driven from any suitable source of power, not shown, is revolubly mounted in a bearing or bushing 30 supported in hollow bosses 31, 31ᵃ projecting from opposite faces of the sub-frame 14 of a motion picture projecting machine.

One end of the shaft 11 projects beyond the boss 31, and is annularly grooved, as at 20, at a point near the outer end of the boss 31. That portion of the projecting end of the shaft extending beyond the annular groove constitutes the support for the sprocket 13, and is provided with a longitudinally extending key way 15 embraced by the bore 12 of the sprocket. The key way extends to the free end of the shaft 11 to provide an open end to slidingly accommodate the inner end of a pre-set key 16 mounted in the bore of the sprocket.

While it might be possible to utilize a sprocket 13 provided with a radial, threaded hole extending from the periphery of the sprocket into the bore of the sprocket to accommodate a threaded screw 10 which might be turned down until its inner end enters the key way 15, but not far enough to apply pressure to, or prevent radial movement of the sprocket on the shaft, there remains the possibility that the screw might accidentally work loose and damage the film, as well as releasing the sprocket from its shaft, by its withdrawal from the key way 15. To avoid this possible failure, the sprocket 13, shown in Fig. 1, is provided with a drilled hole or passage 23 extending radially of the sprocket and located about midway of the ends thereof, the inner end of the passage 23 opening into the bore 12 of the sprocket. Into this passage is driven a cylindrical key-pin 16 of a slightly greater cross-sectional area than the cross-sectional area of the passage, to maintain a driving fit.

The inner end of the key-pin is turned down or reduced in size, as at 17, to a diameter very slightly less than the width of the key way 15, so as to slidingly fit in the key way with as little clearance as possible, to prevent relative rotary movement between the shaft and sprocket, and yet permit the sprocket to slide longitudinally of the shaft in assembling and disassembling the parts and for relatively centering the sprocket and film.

The key-pin 16 projects into the bore 12 of the sprocket sufficiently to maintain its engagement with the key way 15 and leave a slight clearance between the extreme end of the key-pin and the bottom of the key-way, to permit the sprocket or other rotated element to have a slight play of a thousandth of an inch or two, relatively to the shaft 11 in a radial direction, enabling the sprocket to automatically center itself relatively to the shaft, without disconnecting the key from its key way. Thus, full engagement of the sprocket and film is maintained at all times, even with sprockets having barrel-shaped bores.

The reduced end of the key-pin 16 has a further function. In driving the key-pin 16 into place, it forces ahead of it, a slight bur of metal scraped from the wall of the passage 23. If the entire key-pin were uniformly cylindrical, this bur would be forced into the bore 12 of the shaft where it would interfere with the bearing of the sprocket on the shaft, and with sliding the sprocket on and off the shaft. By reducing the inner end of the key-pin, as at 17, the scraping action is now performed by the shoulder at the juncture of the reduced end 17 with the body 16 of the key-pin, apart from the extreme inner end, instead of by the inner end, and the reduced inner end of the key-pin provides an annular space ahead of the shoulder to accommodate the bur of metal scraped from the wall of the passage 23, so that it does not enter the bore of the sprocket.

The extreme free end of the shaft is provided with a threaded hole 22 extending longitudinally into the shaft to accommodate the threaded stem of a cap screw 18, the cap or head 24 of which is substantially greater in diameter than the diameter of the shaft. The threaded screw hole 22 is deeper than the length of the stem of the cap screw 18 so that when the cap screw is applied, the inner face of the head 24 will contact the free end of the shaft.

In assembling the sprocket on the shaft, a hardened wear-resistant washer 33, having a hole slightly larger in diameter than the diameter of the shaft, is first slid onto the shaft 11 to a position between the annular groove 20 and the exposed end of the bearing sleeve 30. Next, a snap ring or split ring washer 34 of larger over-all diameter than the shaft, and having its central opening of a diameter slightly less than the diameter of the shaft, the ring or washer being of a width substantially corresponding with the width of the groove 20, is sprung or fitted into the groove to over-lap and hold the wear resistant washer 33 in place.

Thereafter, a cupped spring washer 19 is slipped over the outer end of the shaft and slid along the shaft until it contacts the outer face of the split ring 34.

The sprocket 13, with its press-fitted key-pin 16 pre-set to gauge, the inner end of which pin projects into the bore 12 of the sprocket, is positioned with its bore 12 in line with the shaft and with the round, inner reduced end of the key-pin 16 in line with the open end of the key-way 15, and then slid onto the shaft until the inner flange or end of the sprocket contacts the cupped spring washer 19.

Thereafter, the headed cap screw 18 is screwed in place in the threaded hole 22. As the cap screw is turned down, its broad head 24 presses against the outer flanged end of the sprocket to maintain the inner end of the sprocket in contact with the cupped spring washer 19 which latter is backed against the snap ring 34.

The wear-resistant washer 33 protects the protruding end of the shaft bushing 30 from being scratched or mutilated by the sharp edges of the snap ring 34.

The headed cap screw 18, 24 retains the sprocket against sliding off the free end of the shaft, and the cupped spring washer 19 tensioned by the pressure of the cap screw head against the sprocket, maintains the sprocket against the inner face of the cap screw head 24 to oppose the longitudinal movement of the sprocket inwardly along the shaft.

It will be clear from the foregoing that this invention permits the sprocket to center itself relatively to the shaft, to maintain concentricity therewith, and also avoids bending, or the imposition of any other strain transversely of the shaft.

It is also seen that the pre-positioned or pre-set key-pin 16, 17 slides freely along the open-ended key-way 15 in the shaft, and that this key-pin connection transmits rotary movement from the shaft to the sprocket, avoiding the set-screw connection heretofore used.

Furthermore, the head of the cap screw in conjunction with the cupped spring 19 tensioned by the same cap screw, holds the outer end of the sprocket even with the free end of the shaft, where it is in proper position relatively to the film path, so that a proper alignment of the film will be maintained as it is fed from one sprocket to another and to the take-up magazine.

Heretofore, considerable time and labor has been expended in the production of accurate sprockets and sprocket shafts in the motion picture industry to provide precisely designed parts, which, when assembled according to former methods, run out of true despite the care used, because of the fastening means employed to secure the parts fixedly together against relative movement. A tolerance of one or two thousandths of an inch is permissible, but any more impairs the film feeding operation.

By the use of this invention wherein the parts have a floating connection instead of being fixedly connected to form a substantially integral unit, an almost perfect adjustment is obtained. Obviously, therefore, this will permit the production of parts which need not be held to such great accuracy as heretofore, with a consequent economy in time and labor, and a greater output, so long as the tolerance or "run out" is not more than one or two thousandths of an inch.

Changes may be made in the form and arrangement of the several parts described without departing from the spirit and scope of this invention.

What I claim as new, is:

1. In a means to releasably connect an element to a continuously rotatable shaft, for rotation with the shaft, the combination with a rotary shaft having a key-way; and an element having an axial bore to accommodate the shaft and a radial opening leading from the periphery of said element to its bore; of a pre-set key having a driving fit in the radial opening, the inner end of the key protruding part-way into the key-way and being reduced to provide a chamber between the reduced inner end of the key and the wall of the radial opening to accommodate burrs, said reduced inner end having a sliding engagement with the key-way; a stop member to limit movement of the element longitudinally of the shaft in one direction; and a resilient means contacted by the element in its movement along the shaft in the opposite direction.

2. The combination, with a rotatable shaft having a key-way extending longitudinally of the shaft from the outer end thereof, of an element having an axial bore accommodating said shaft slidingly, said element also having a radially extending unthreaded passage from its periphery to its axial bore; an unthreaded, normally non-removable key-pin of slightly larger diameter than said passage, said key-pin being forcibly driven, the inner end of said key-pin being of substantially the same width as said key-way and extending only part-way into the axial bore of said element to clear the bottom of the key-way and to slide along the key-way to enable the ready application and removal of said element relative to said shaft; and means for releasably retaining said element on said shaft.

3. The combination, with a shaft bearing; and a shaft rotatably supported in the shaft bearing, and having a longitudinal key-way extending inwardly from one end of the shaft; of an element having an axial bore and fitting slidably over said shaft about said key-way, said element being provided with a radial bore extending from the periphery to said axial bore thereof; an unthreaded key-pin of slightly larger diameter than said bore forcibly driven into said radial bore, the inner end of said key-pin being of a width to fit slidingly in said key-way, and protruding part-way only into said key-way to clear the bottom thereof; said shaft having a circumferential groove between the inner end of said element and said bearing; a split ring of greater overall diameter than said shaft fitted snugly into said groove to afford a fixed abutment to space the inner end of said element apart from the exposed end of said shaft bearing; a cupped resilient washer interposed between the inner end of said rotatable element and said split ring; and retaining means engaged with the outer end of said shaft and said rotatable element to press the latter against said cupped resilient washer.

HENRY F. HEIDEGGER.

References Cited in the file of this patent

UNITED STATES PATENTS

| Number | Name | Date |
|---|---|---|
| 465,175 | Geisinger | Dec. 15, 1891 |
| 1,192,404 | Ewart | July 25, 1916 |
| 1,445,830 | Gifford | Feb. 20, 1923 |
| 2,331,647 | Barkstrom et al. | Oct. 12, 1943 |

FOREIGN PATENTS

| Number | Country | Date |
|---|---|---|
| 360,770 | Great Britain | Nov. 12, 1931 |